US012092024B1

(12) United States Patent
Grech et al.

(10) Patent No.: US 12,092,024 B1
(45) Date of Patent: Sep. 17, 2024

(54) GAS TURBINE ENGINE

(71) Applicant: ROLLS-ROYCE plc, London (GB)

(72) Inventors: Nicholas Grech, Derby (GB); Jacopo Tacconi, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/601,182

(22) Filed: Mar. 11, 2024

(30) Foreign Application Priority Data

Mar. 28, 2023 (GB) ...................... 2304478

(51) Int. Cl.
*F02C 6/18* (2006.01)
*F02C 9/28* (2006.01)

(52) U.S. Cl.
CPC . *F02C 6/18* (2013.01); *F02C 9/28* (2013.01)

(58) Field of Classification Search
CPC ............... F02C 6/18; F02C 7/224; F02C 9/28
See application file for complete search history.

(56) References Cited

U.S. PATENT DOCUMENTS

| | | | | |
|---|---|---|---|---|
| 6,079,222 A * | 6/2000 | Fetescu | ...................... | F17C 9/04 62/915 |
| 2015/0300260 A1* | 10/2015 | Wollenweber | ............ | F02C 9/40 60/39.12 |
| 2017/0268431 A1 | 9/2017 | Schwarz | | |
| 2018/0209353 A1* | 7/2018 | Nixdorf | ................... | F01D 15/10 |
| 2019/0153952 A1* | 5/2019 | Niergarth | ................... | F02C 7/14 |
| 2021/0340908 A1 | 11/2021 | Boucher et al. | | |
| 2022/0099020 A1 | 3/2022 | Palmer | | |
| 2022/0297844 A1 | 9/2022 | Mackin et al. | | |

OTHER PUBLICATIONS

Sep. 12, 2023 Search Report issued in British Patent Application No. 2304478.7.

* cited by examiner

*Primary Examiner* — Todd E Manahan
*Assistant Examiner* — Rodolphe Andre Chabreyrie
(74) *Attorney, Agent, or Firm* — Oliff PLC

(57) ABSTRACT

A gas turbine engine includes a core engine having a compressor, a combustor and a turbine in sequential air flow series. The engine further includes a fuel offtake configured and arranged to divert a portion of hydrogen fuel from a main fuel conduit, a burner configured and arranged to burn the portion of hydrogen fuel diverted from the main fuel conduit and a heat exchanger configured and arranged to transfer heat from exhaust gasses produced by the burner to hydrogen fuel in the main fuel conduit. At least first and second compressor bleed offtakes are at different pressure stages of the compressor, each being configured to bleed a portion of air from the compressor. At least first and second compressor bleed offtake valves are configured to control flow through the first and second bleed offtakes respectively. The burner is configured to receive bleed air from the compressor bleed offtakes.

9 Claims, 4 Drawing Sheets

| | Symbol Legend |
|---|---|
| ■ | Compressor bleed air |
| – – – | Cryogenic liquid fuel line |
| – – – – | Heated fuel line |
| – · – · – | Pre-heater exhaust gasses |

GAS TURBINE ENGINE

TECHNICAL FIELD

This disclosure relates to fuel systems for hydrogen-fueled aero gas turbine engines.

BACKGROUND

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or a liquid. Such fuel requires heating prior to delivery to the gas turbine, both to permit combustion, and to prevent icing. As such, the applicant has filed patent application EP 3978738 directed to a pre-heater for heating hydrogen gas using an auxiliary combustor utilising a portion of the hydrogen fuel, and air bled from the gas turbine engine.

However, operation of the pre-heater significantly reduces efficiency of the gas turbine engine, resulting in an increase in specific fuel consumption of several percent. The present disclosure seeks to provide an improved system, having greater efficiency.

SUMMARY

The invention is directed towards a gas turbine engine comprising a fuel system having a hydrogen fuel heater for heating cryogenically-stored hydrogen fuel prior to injection into gas turbine engines, and methods of operating such gas turbines.

In a first aspect, one such gas turbine engine comprises:
a core engine comprising a compressor, a combustor and a turbine in sequential air flow series;
a fuel offtake configured and arranged to divert a portion of hydrogen fuel from a main fuel conduit;
a burner configured and arranged to burn the portion of hydrogen fuel diverted from the main fuel conduit;
a heat exchanger configured and arranged to transfer heat from exhaust gasses produced by the burner to hydrogen fuel in the main fuel conduit;
at least first and second compressor bleed offtakes configured to bleed a portion of air from the compressor, the first and second compressor bleed offtakes being provided at different pressure stages of the compressor; and
at least first and second compressor bleed offtake valves configured to control flow through the first and second bleed offtakes respectively; wherein
the burner is configured to receive bleed air from the compressor bleed offtakes.

In an embodiment, the gas turbine engine comprises third and, optionally, fourth compressor bleed offtakes, the third and fourth compressor bleed offtakes being provided at different pressure stages of the compressor; and respective third and fourth bleed offtake valves configured to control flow through the third and fourth bleed offtakes respectively.

In an embodiment, the gas turbine engine comprises a low-pressure compressor and a high-pressure compressor in sequential air flow series driven by low-pressure and high-pressure turbines respectively.

In an embodiment, at least the first and second compressor bleed offtakes are configured to bleed a portion of air from the high-pressure compressor.

In an embodiment, the gas turbine engine comprises a controller configured to control each of the compressor bleed offtake valves in accordance with a schedule.

In an embodiment, the controller is configured to select a bleed offtake valve at the lowest compressor stage which meets at least one of a pre-heater minimum combustion pressure and a pre-heater minimum combustion temperature for provision of compressed air to the burner.

In an embodiment, the controller is configured to select a bleed offtake valve for provision of compressed air to the burner, which meets a pre-heater minimum combustion pressure and a required fuel delivery minimum temperature while resulting in the lowest overall system fuel flow.

In an embodiment, the burner comprises the heat exchanger. In another embodiment, the burner and the heat exchanger are separate units.

In a second aspect, there is provided a method of delivering cryogenically-stored hydrogen fuel to a gas turbine engine in accordance with the first aspect, comprising:
pumping the hydrogen fuel from a cryogenic storage system through a main fuel conduit;
diverting a portion of hydrogen fuel from the main fuel conduit;
burning the portion of hydrogen fuel diverted from the main fuel conduit in a burner with compressed air bled from the gas turbine engine compressor.

In an embodiment, the method comprises selecting one or more bleed offtake valve in communication with the lowest compressor stage or combination of stages which meets a pre-heater minimum combustion pressure.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
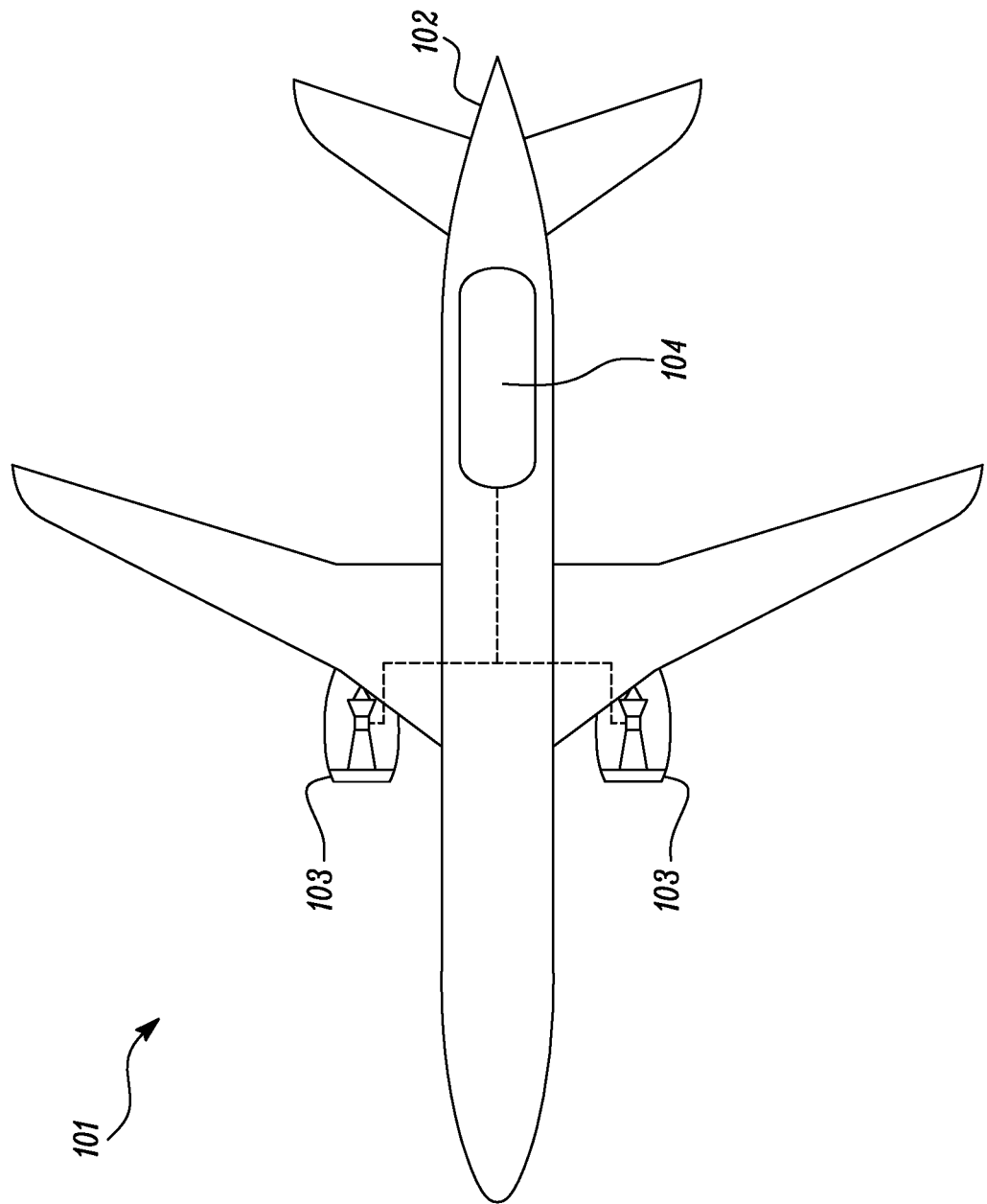
FIG. 1 shows a hydrogen-fueled airliner comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and substantially identical underwing-mounted turbofan engines 103.

A hydrogen storage tank 104 located in the fuselage 102. In the present embodiment, the hydrogen storage tank 104 is a cryogenic hydrogen storage tank and thus stores the hydrogen fuel in a liquid state, in a specific example at 22 Kelvin. In this example, the hydrogen fuel is pressurised to a pressure from around 1 bar to around 3 bar, in a specific example 2 bar.

Figure 2:
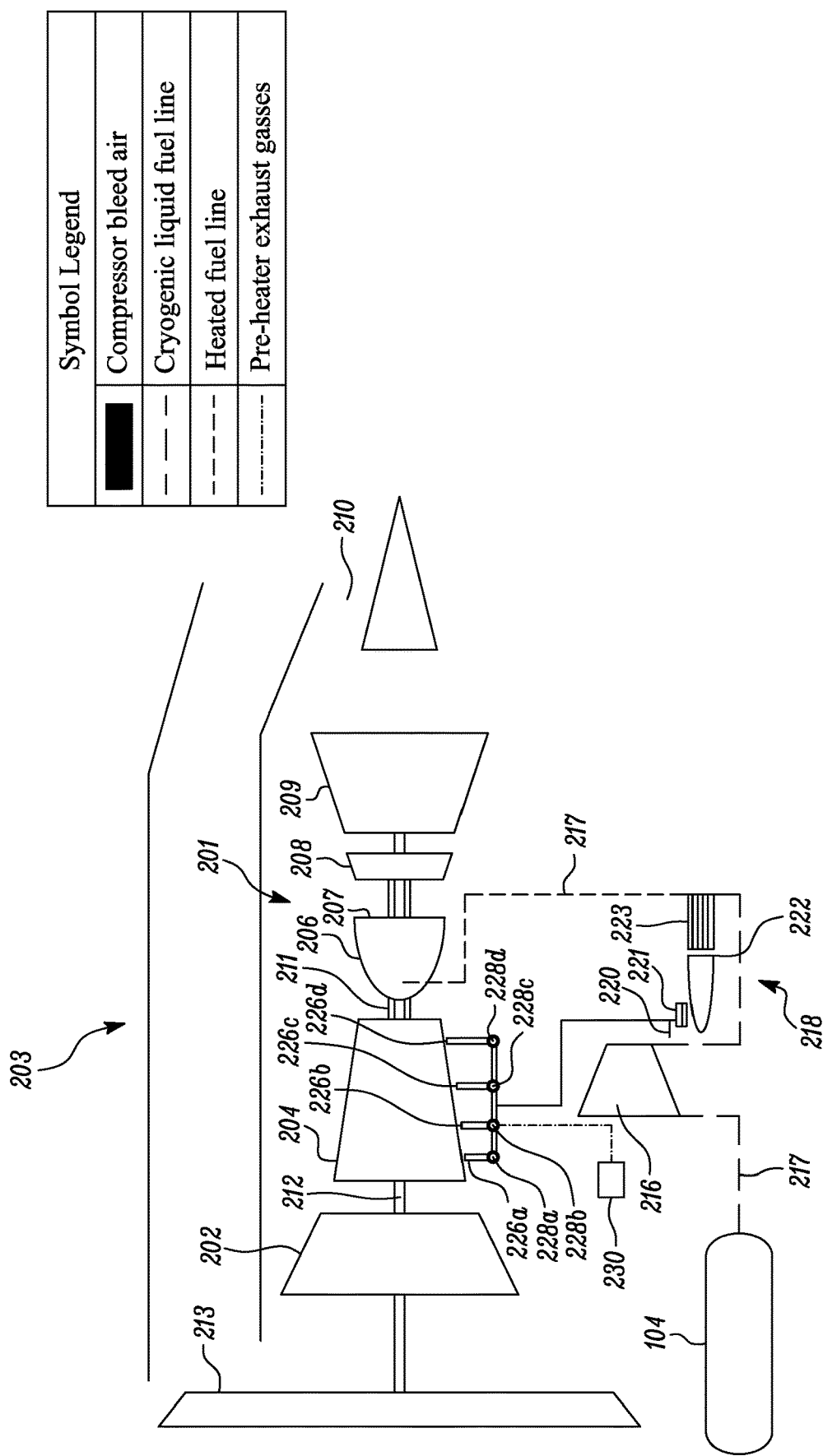
FIG. 2 is a block diagram of one of the engines of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

In operation, the low-pressure turbine 209 drives a fan 213 via shaft 212.

In operation, hydrogen fuel is pumped from the hydrogen storage tank 104 by a pump 216 and into a main fuel conduit 217 which ultimately delivers fuel to the fuel injection system 206. The pump may be driven by an electric machine or via one or more of the gas turbine engine core shafts 211, 212 via an auxiliary gearbox.

As will be appreciated, it is desirable to increase the temperature of the fuel from the 22 Kelvin cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 Kelvin.

In the present embodiment, a heater 218 is therefore provided for heating of the hydrogen fuel, and possibly to implement a phase change where the hydrogen is stored as a liquid. In the present embodiment, this takes place between the pump 216 and the fuel injection system 206. In an embodiment, the heater 218 is configured to raise the temperature of the hydrogen fuel to the required injection temperature.

The heater 218 comprises an offtake 220 to divert a portion of the hydrogen fuel from the main fuel conduit 217. The amount of hydrogen bled from the main fuel conduit 217 is controlled by a valve (not shown). In an embodiment, the valve is controlled actively, for example in response to the temperature of the fuel at the fuel injection system 206. Alternatively, the valve may be passively controlled. In operation, of the order of around 1 percent of the hydrogen fuel flow through the main fuel conduit 217 is bled for use in the heater 218.

As described previously, hydrogen has very high specific and latent heat capacities; however as a gas it has a very low molecular weight and density, and thus it can be challenging to exchange heat in a compact way. However, these properties may also be beneficial, as described later herein. Thus, the heater 218 heats the hydrogen fuel in the main fuel conduit 217 by combustion of the bled fuel in a burner 222 located in heat exchange relationship with the main fuel conduit 217 via a heat exchanger 223. As will be understood, fuel for the burner 222 must also be provided at an acceptable temperature, and a smaller auxiliary fuel heater 221 may be provided for this.

It should be understood that, in the present example, the products of combustion from the burner 222 are not mixed with the fuel in the main fuel conduit 217. In this respect, the pre-heater 218 therefore differs from a pre-burner system as used in staged combustion cycle rocket engines.

In order to reduce the volume of the burner 218, it is desirable to use a high-pressure source of air, which provides sufficient mass-flow in a small volume to combust the hydrogen fuel. As such, air for combustion with the bled hydrogen fuel is bled from a compressor of the gas turbine engine core, and in this embodiment, from the high-pressure compressor 204. Air is bled from the high-pressure compressor 204 from a plurality of compressor bleeds 226a-d via respective bleed air valves 228a-d. Alternatively, air may be bled from the low-pressure compressor 202.

Both the high and low-pressure compressors 202, 204 operate at different absolute pressures during operation, with the high-pressure compressor 204 operating at a higher pressure than the low-pressure compressor 202. Additionally, each compressor 202, 204 comprises a plurality of compressor stages, each of which operates at a different absolute pressure than each of the other stages, with pressure rising through each stage. For example, the low-pressure compressor 202 may comprise between two and five stages, while the high-pressure compressor 204 may comprise between five and ten stages. In some examples, each compressor may comprise a multi-stage axial-flow compressor, though other types of multi-stage compressors may be suitable, such as centrifugal or axi-centrifugal types as are well known to the skilled person. In the present embodiment, the low-pressure compressor 202 comprises three stages, while the high-pressure compressor 204 comprises ten stages. It will be understood that, as the compressor pressure rises, so does the temperature of the compressed gas.

In the present embodiment, four compressor bleeds 226a-d are provided. The first compressor bleed 226a is provided at a stage which represents 10% of the overall temperature rise provided by the high-pressure compressor 204. The second compressor bleed 226b is provided at a stage which represents 40% of the overall temperature rise of the high-pressure compressor 204. The third compressor bleed 226c is provided at a stage which represents 60% of the overall temperature rise of the high-pressure compressor 204. The fourth compressor bleed 226d is provided at a stage which represents 75% of the overall temperature rise of the high-pressure compressor 204. As will be understood, the temperature rise provided by the compressor will vary depending on shaft rotational speed. However, the relative work done by each stage is relatively constant throughout operation, and as such, the relative temperature rise as a proportion of overall compressor temperature rise is also constant, irrespective of engine rotational speed, environmental conditions etc.

Figure 3:
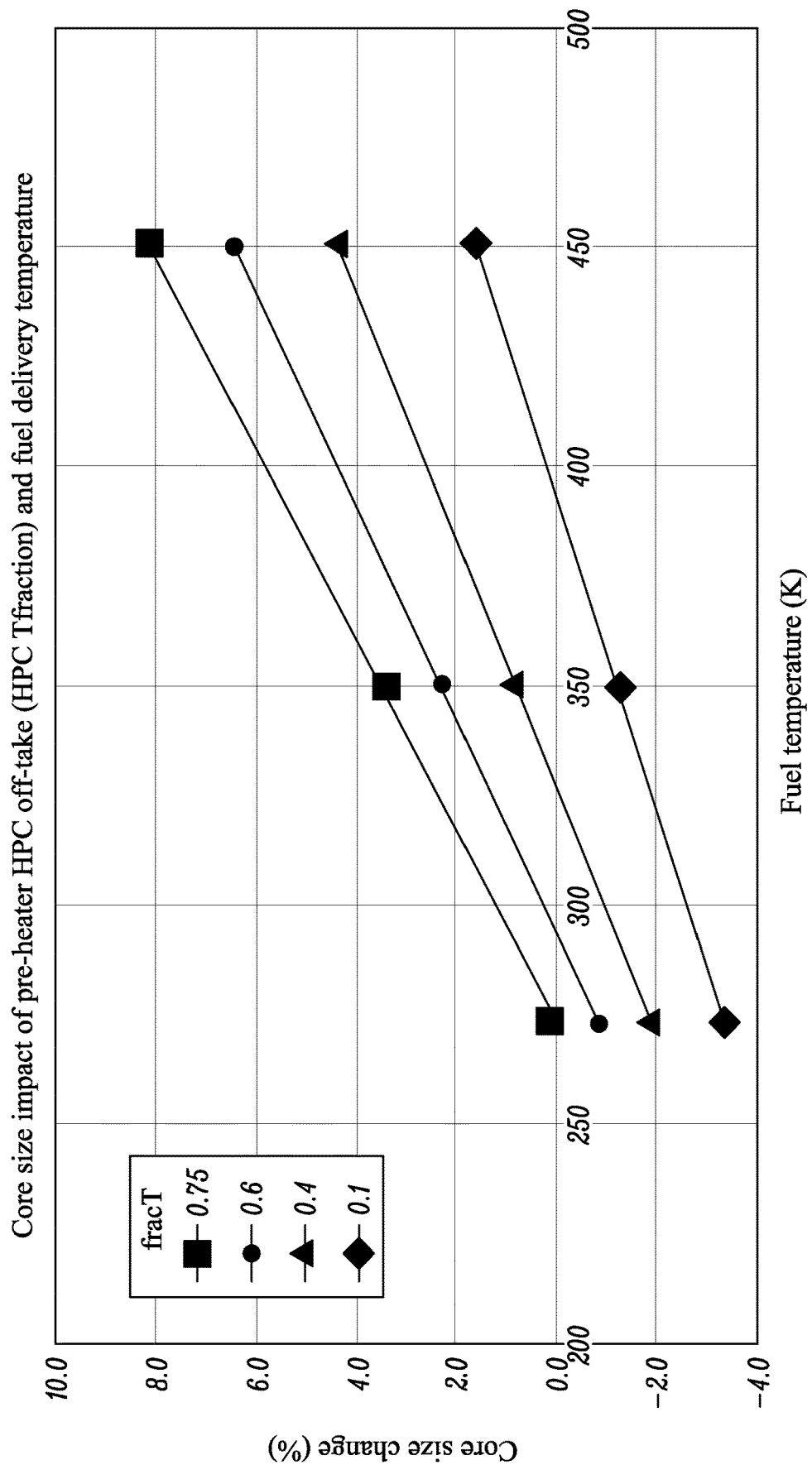
FIG. 3 is a graph showing a relationship between fuel temperature and core size for various compressor bleed offtakes.

Referring to FIG. 3, the impact of the bleed flow on the overall core size of the gas turbine engine 203 at different bleed points is shown relative to a baseline, in which air is drawn from the fourth compressor bleed 226d.

As can be seen, in general, as the required fuel delivery temperature increases, the core size also increases due to the higher bleed flows required to supply sufficient high-pressure air to the burner 218. Raising the fuel delivery temperature increases core size by approximately 1.5% for every 100° C. increase in fuel delivery temperature. As will be understood, increased core size correlates with increased core mass.

However, for a given fuel delivery temperature, the stage from which the high-pressure air is drawn also affects core size. For example, providing bleed flow from a stage having a fractional temperature rise of 75% of overall high-pressure compressor temperature rise (which corresponds to the fourth bleed 226d) results in a core size that is approximately 3.5% larger than where the bleed flow is drawn from a stage having a fractional temperature rise of 10% of overall high-pressure compressor temperature rise (which corresponds to the first bleed 226a). Similarly, drawing compressed air from intermediate stages results in intermediate core sizes. As such, it is desirable to draw air from the lowest compressor stage possible to minimise core size despite the resultant higher preheater fuel flow required (in view of the higher heat input required due to the lower compressor bleed air temperature). In studies conducted by the inventors, the inventors have found that core gas turbine engine core size is a more important consideration than preheater fuel flow. On the other hand, if bleed air having a pressure which is too low is utilised, the size of the burner becomes excessive. As such, it is typically necessary to utilise compressor bleed from the high-pressure compressor 204.

Figure 4:
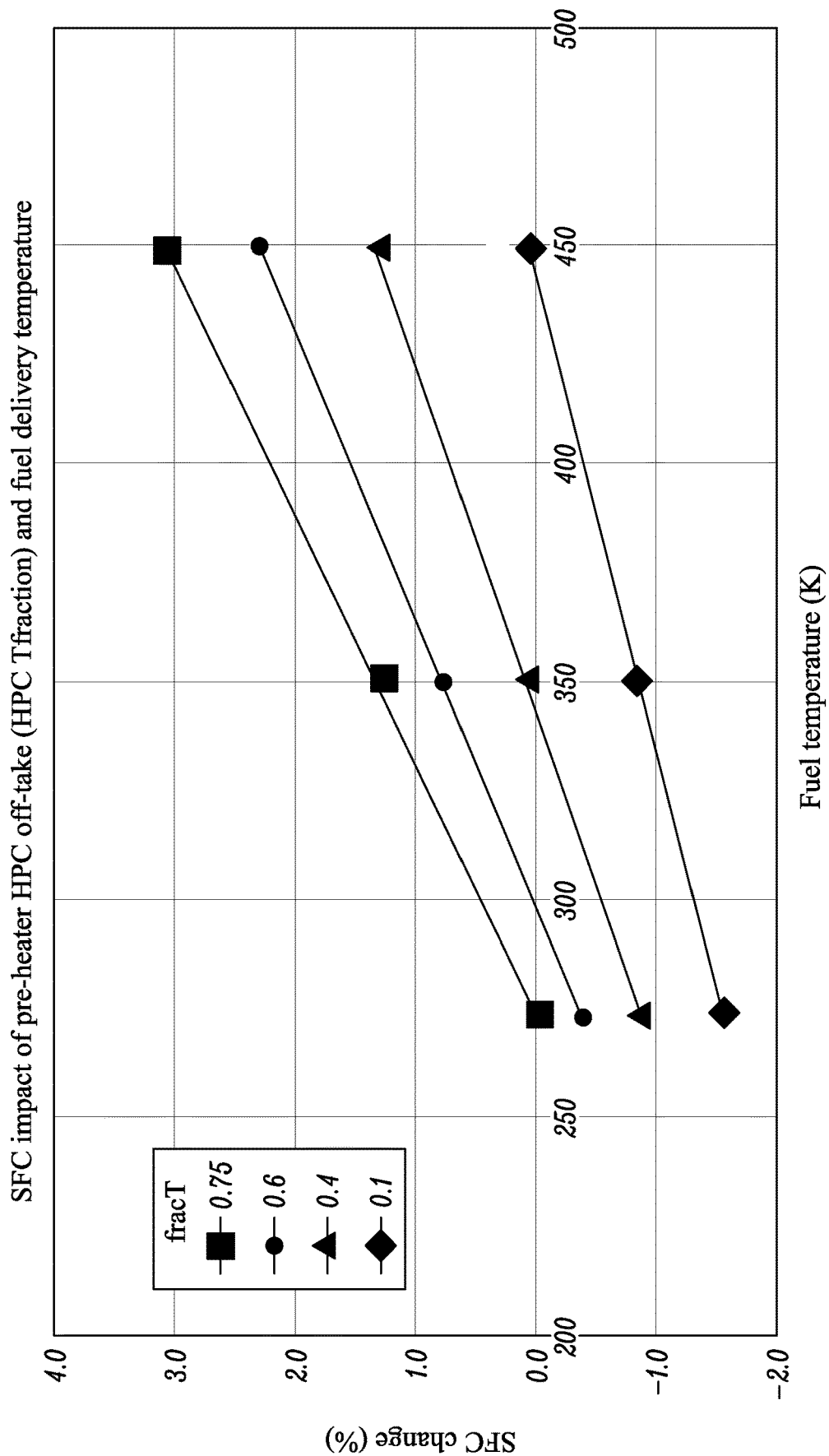
FIG. 4 is a graph showing a relationship between fuel temperature and thrust specific fuel consumption various compressor bleed offtakes.

Similarly, FIG. 4 shows the impact of the bleed flow on the overall Thrust Specific Fuel Consumption (SFC) of the gas turbine engine 203 at different bleed points is shown relative to a baseline, in which air is drawn from the fourth compressor bleed 226d. A lower SFC is generally desirable, as this will reduce overall fuel consumption, and increase range. Again, in general, as the required fuel delivery temperature increases, the SFC also increases due to the higher bleed flows required to supply sufficient high-pressure air to the burner 218, and also (to a lesser extent) to the increased burner fuel flow required. Raising the fuel delivery temperature increases SFC by approximately 1.5% for every 100° C. increase in fuel delivery temperature. As will be understood, increased core size correlates with increased core mass.

However, for a given fuel delivery temperature, the stage from which the high-pressure air is drawn also affects SFC. For example, providing bleed flow from a stage having a fractional temperature rise of 75% of overall high-pressure compressor temperature rise (which corresponds to the fourth bleed 226d) results in an SFC that is approximately 1.5% higher than where the bleed flow is drawn from a stage having a fractional temperature rise of 10% of overall high-pressure compressor temperature rise (which corresponds to the first bleed 226a). Similarly, drawing compressed air from intermediate stages results in intermediate SFC deltas. As such, it is desirable to draw air from the lowest compressor stage possible to minimise SFC.

Accordingly, the valves 228a-d are controlled by a controller 230 in accordance with a control schedule. In general, the controller 230 controls the valves 228a-d to maintain the pressure and temperature of bleed air delivered to the pre-heater 218 above at least one of a minimum temperature and a minimum pressure using the bleed 226a-d at the lowest pressure which provides this minimum temperature and pressure. Accordingly, flow requirements are met at all conditions of flight, irrespective of thrust, while causing a minimal impact on thrust specific fuel consumption, and while minimising core size. As such, overall system fuel flow (i.e. core gas turbine combustor 206 and burner 218 fuel flow) is minimised, by selecting the lowest stage bleed available. Where the pre-heater fuel flow is heated by an auxiliary fuel heater 221 powered by compressed air, there is also the requirement that the heat in the compressed air is sufficient to provide fuel to the pre-heater having a required minimum temperature. As such, the controller 230 may be configured to control the valves 228a-d to ensure that both the burner 222 and main gas turbine engine core temperature and pressure requirements are met.

In general, the required pressure of bleed air delivered to the pre-heater remains substantially constant at all phases of flight, and always above the minimum required. However, one or more of a flow rate and a delivery pressure may vary, depending on thrust requirements. For example, at higher thrusts, fuel flow rate increases, thereby increasing the required heat input to the fuel from the pre-heater to maintain the combustor fuel delivery temperature and pressure at the required levels. Consequently, while available compressor bleed temperature and pressure at a given compressor stage increases with increasing thrust, so does the demanded bleed air requirements. These varying demands and supply pressure and temperatures may not match at all phases of flight. As such, operation of the valves 228a-d may be complex, and will not necessarily vary linearly with thrust demand. Finally, the demand and supply may be particularly mismatched during transient operation, for example during engine acceleration and deceleration.

In one example, the controller 230 is configured to operate the valves 228a-d in accordance with an open-loop model. For example, the controller may operate in accordance with a fixed schedule based on thrust demand. In other examples, the controller may be in signal communication with one or more sensors, such as compressor bleed air temperature and pressure sensors. The controller may receive a required thrust, calculate an equivalent required bleed air temperature and pressure, and open the valve 228a-d in communication with the lowest pressure compressor stage which meets or exceeds both the required temperature and pressure. In one further example, the compressor bleed air temperatures may be determined indirectly. For example, the bleed air temperature could be calculated from gas turbine inlet total pressure P10 and total temperature T10, and high pressure compressor rotational speed N2.

Irrespective of how the controller calculates the required valve, in one embodiment, only one valve 228a-d will be open at any given time, with the rest remaining closed. Otherwise, compressor bleed air could flow between bleeds 226a-d, rather than downstream into the pre-heater. In some cases, the valves 228a-d may be operable at varying positions, such that flow rates and/or pressures can be more finely controlled. In other embodiments, the arrangement may be configured such that the pressure in the direction of the pre-heater is lower than either of the bleed ports, and so multiple valves may be opened to provide intermediate pressures. In some cases, one or more check valves may be provided to prevent back-flow. Such a system may prevent combustion instability, which might otherwise arise as a result of sudden switching between different pressure sources.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A gas turbine engine comprising: a core engine comprising a compressor, a combustor and a turbine in sequential air flow series;
   a fuel offtake configured and arranged to divert a portion of hydrogen fuel from a main fuel conduit;
   a burner configured and arranged to burn the portion of hydrogen fuel diverted from the main fuel conduit;
   a heat exchanger configured and arranged to transfer heat from exhaust gasses produced by the burner to hydrogen fuel in the main fuel conduit;
   at least first and second compressor bleed offtakes configured to bleed a portion of air from the compressor, the first and second compressor bleed offtakes being provided at different pressure stages of the compressor;
   and at least first and second compressor bleed offtake valves configured to control flow through the first and second bleed offtake respectively; wherein the burner is configured to receive bleed air from the compressor bleed offtakes.

2. A gas turbine engine according to claim 1, wherein the gas turbine engine comprises third and, optionally, fourth compressor bleed offtakes, the third and fourth compressor bleed offtakes being provided at different pressure stages of the compressor; and respective third and fourth bleed offtake valves configured to control flow through the third and fourth bleed offtakes respectively.

3. A gas turbine engine according to claim 1, wherein the gas turbine engine comprises a low-pressure compressor and a high-pressure compressor in sequential air flow series driven by low-pressure and high-pressure turbines respectively.

4. A gas turbine engine according to claim 3, wherein at least the first and second compressor bleed offtakes are configured to bleed a portion of air from the high-pressure compressor.

5. A gas turbine engine according to claim 1, wherein the gas turbine engine comprises a controller configured to control each of the compressor bleed offtake valves in accordance with a schedule.

6. A gas turbine engine according to claim 5, wherein the controller is configured to select a bleed offtake valve at the lowest compressor stage which meets at least one of a pre-heater minimum combustion pressure and a pre-heater minimum combustion temperature for provision of compressed air to the burner.

7. A gas turbine engine according to claim 1, wherein the burner comprises the heat exchanger.

8. A method of delivering cryogenically-stored hydrogen fuel to a gas turbine engine in accordance with claim 1, comprising:

pumping the hydrogen fuel from a cryogenic storage system through a main fuel conduit;

diverting a portion of hydrogen fuel from the main fuel conduit;

burning the portion of hydrogen fuel diverted from the main fuel conduit in a burner with compressed air bled from the gas turbine engine compressor.

9. A method according to claim 8, wherein the method comprises selecting one or more bleed offtake valve in communication with the lowest compressor stage or combination of stages which meets a pre-heater minimum combustion pressure.

\* \* \* \* \*